UNITED STATES PATENT OFFICE.

GEORGE T. LEWIS, OF PHILADELPHIA, PENNSYLVANIA.

MANUFACTURE OF FERTILIZERS.

SPECIFICATION forming part of Letters Patent No. 238,133, dated February 22, 1881.

Application filed September 18, 1880. (No model.)

*To all whom it may concern:*

Be it known that I, GEORGE T. LEWIS, of the city and county of Philadelphia, and State of Pennsylvania, have invented an Improvement in the Manufacture of Fertilizers, of which the following is a specification.

My invention relates to the manufacture of fertilizers from insoluble phosphates in general; and it consists in finely pulverizing bone-phosphate or any other insoluble compound of phosphoric acid, such as South Carolina rock, apatite, &c., and mixing this with pyrites, and exposing the mixture to the action of atmospheric oxygen and moisture for some time, while the water that evaporates is replaced by sprinkling the mixture with water from time to time.

In carrying out my invention I prefer to make piles or heaps of the above-described mixture, which is placed under a shed, to prevent rain from washing out soluble compounds of phosphoric acid as they are formed.

The proportion of the chemicals used depends upon the composition of the pyrites and phosphates; but in general I prefer to each equivalent of phosphoric acid in the phosphate (71) to have two equivalents of sulphur in the pyrites, (32,) and to each equivalent of carbonate of lime in the phosphates (50) to have one equivalent of sulphur in the pyrites, (16;) or, if the phosphate contains fifty-five per cent. bone-phosphate and ten per cent. carbonate of lime, and the pyrites contain fifty per cent. of sulphur, then I would use on one hundred pounds bone-phosphate twenty-nine pounds of pyrites. More pyrites may be used, and in some cases less; but in the latter case soluble sulphate of lime is not produced. Less than one equivalent of sulphur of the pyrites cannot be used on one equivalent of phosphoric acid.

The time required to render the phosphate valuable as a manure depends upon the pyrites, as some kinds are much more easily oxidized than others; also upon the climate, since in moist climates oxidation of the pyrites takes place more quickly than in dry climates; but in any case two or three months, or more, will be required to produce the desired result.

In this condition the oxygen of the air and the moisture added from time to time react upon the pyrites and form sulphuric acid and sulphate of iron, and these again with the phosphate, and give dihydro-monocalcic phosphate (soluble phosphate of lime) and monohydro-dicalcic phosphate (reverted phosphate of lime) and oxide of iron, and a valuable fertilizer is obtained, containing hydrated oxide of iron, which will aid in condensing ammonia and carbonic acid of the atmosphere for the use of the plant, while the phosphate of lime and sulphate of lime act in the same capacity as in other fertilizers.

I am aware of the process of oxidizing sulphur in the old method of making alum from pyritic shales, as set forth in Graham's Elements of Inorganic Chemistry, and do not claim anything therein described. Neither do I claim treating the natural phosphates by the gases from burning pyrites.

Having now described my invention, what I claim as new, and desire to secure by Letters Patent, is—

The herein-described process of manufacturing a fertilizer, consisting in mixing together finely-pulverized bone-phosphate, or other insoluble compound of phosphoric acid, with coarsely powdered or broken pyrites, in the proportions herein set forth, and exposing the same to the joint action of atmospheric oxygen and moisture for several months, substantially as and for the purpose specified.

In testimony of which invention I hereunto set my hand.

GEORGE T. LEWIS.

Witnesses:
JNO. L. VANDIVER,
H. R. SHULTZ.